United States Patent [19]

Tevaarwerk

[11] Patent Number: 5,385,408

[45] Date of Patent: Jan. 31, 1995

[54] ROCKER TIP ROLLER HYDRODYNAMIC BEARING OIL SLOTS

[75] Inventor: Joseph L. Tevaarwerk, Worthington, Ohio

[73] Assignee: Gas Research Institsute, Chicago, Ill.

[21] Appl. No.: 137,368

[22] Filed: Oct. 18, 1993

[51] Int. Cl.⁶ ............... F16C 32/06; F16C 7/00; F01L 1/18

[52] U.S. Cl. ............... 384/115; 123/90.39; 384/155

[58] Field of Search ............... 384/5, 58, 154, 155, 384/156, 100, 114, 115, 286, 289, 291, 372, 375; 123/90.39

[56] References Cited

U.S. PATENT DOCUMENTS

| | | |
|---|---|---|
| 812,847 | 2/1906 | Hensley ............... 384/385 |
| 1,233,127 | 7/1917 | Ross ............... 384/155 |
| 1,987,093 | 1/1935 | Zerk ............... 384/154 |
| 2,830,541 | 4/1958 | Higgins et al. ............... 384/115 X |
| 2,916,333 | 12/1959 | Johnson . |
| 3,380,789 | 4/1968 | Nigh ............... 384/155 |
| 4,252,383 | 2/1981 | Simpson . |
| 4,531,420 | 7/1985 | Arai et al. ............... 74/467 |
| 4,726,693 | 2/1988 | Anderson et al. ............... 384/114 |
| 4,748,862 | 6/1988 | Johnston ............... 74/7 R |
| 5,074,261 | 12/1991 | Hamburg et al. ............... 123/90.39 |
| 5,259,346 | 11/1993 | Mills ............... 123/90.39 |

*Primary Examiner*—Thomas R. Hannon
*Attorney, Agent, or Firm*—Watkins, Dunbar & Pollick

[57] ABSTRACT

A hydrodynamic bearing for limited roller oscillation incorporates a pair of oil slots which clear debris from the roller/pin interface and provide oil to readily lubricate the entire load bearing surface of a pin. The preferred oil slots each extend lengthwise along the pin, and widthwise generally across respective chords of the pin circumference. The oil slots are positioned in spaced relationship such that their respective chords define an angle whose vertex is beyond the circumference of the pin, and their spacing defines an upper load bearing zone along a portion of the circumference of the pin, and opposite therefrom, a larger, lower load bearing zone defined along another portion of the circumference of the pin.

20 Claims, 3 Drawing Sheets

ROCKER TIP ROLLER HYDRODYNAMIC BEARING OIL SLOTS

BACKGROUND OF THE INVENTION

The present invention relates to the lubrication of a pin-mounted rocker tip roller, and in particular to bearing oil slots in the pin which supply lubricant to and clear debris from between the pin and roller.

Rocker tip rollers have long been used in long-life combustion engines to transfer the rocking motion of a rocking member to a linear motion member, without imposing side loads, and with minimal wear between the members. Rocker tip rollers require lubrication at the roller/pin interface, to facilitate the rather limited roller rotation about the pin which is induced by relative motion between the rocking member and linear motion member. The limited roller rotation and point or line contact by the roller are what produce linear motion in the linear motion member, without side loading and with minimal friction wear. Longer life operation is thereby enjoyed in engines which use rocker tip rollers.

In combustion engines, a rocker tip roller is typically incorporated into one end of a rocker arm and contacts the end of a valve stem to produce linear motion at the valve. Typically, the rocker tip roller is mounted on a pin and may include a bushing between the pin and roller. Lubrication is most often provided by lubricating oil applied at the roller/pin interface, and the oil penetrates into the interface. When pressure is applied to the rocker tip roller and causes the roller to roll relative to the pin, a squeeze film develops at the interface and oil squeezes out axially along the pin. Although oil again migrates into the interface when the pressure is reduced, it has been found that the center of the roller/pin interface is typically starved for oil so that a complete squeeze film does not form, increasing friction wear. The limited amount of oil available to penetrate to the center of the interface contributes to this problem.

In addition, it has been found that debris manages to find its way into the roller/pin interface, causing damage to the pin and roller surfaces, and where used, to the bushing surfaces. The grooving, abrasion and increased friction at the roller/pin or bushing/pin interface can result in premature and sudden failure of the engine.

Accordingly, the need exists for improved lubrication of rocker tip roller lubrication to prevent failure and improve the longevity of such elements in engines designed for long-life performance.

SUMMARY OF THE INVENTION

The present invention satisfies this need with a hydrodynamic bearing for limited roller oscillation which incorporates oil slots which clear debris from the roller/pin interface and provide oil to readily lubricate the entire load bearing surface of a pin.

The hydrodynamic bearing of the present invention includes a generally cylindrical pin having first and second end portions for rigid connection to a supporting element, and first and second oil slots formed into the surface of the pin. More than simple grooves, the oil slots each extend lengthwise along respective portions of the pin between the end portions, and extend widthwise generally across respective chords of the pin circumference. The first and second oil slots are positioned in spaced relationship such that their respective chords define an angle whose vertex is preferably beyond the circumference of the pin. An upper load bearing zone is defined along the circumference of the pin lengthwise between the first and second oil slots, while a larger, lower load bearing zone is defined along the circumference of the pin lengthwise between the first and second oil slots.

The cylindrical pin surface is finished for direct contact with the cylindrical bore of a roller which oscillates through an arc around the pin due to relative motion between the rocking member on which it is mounted via the pin and the linear motion member. When the pin is thus assembled with the roller, the first and second oil slots on the pin define therewith large oil reservoirs. Oil from the first and second oil slots is readily available over the entire load bearing zone, and as the roller oscillates through an arc, oil wipes across the roller surfaces and lubricates the roller/pin interface. The availability of large quantities of oil to the load bearing zones also serves to flush debris from the load bearing zones.

These and other objects, features and advantages of the present invention will be apparent from the drawings and detailed description which follow.

DETAILED DESCRIPTION OF THE PREFERRED EMBODIMENTS

Figure 1:
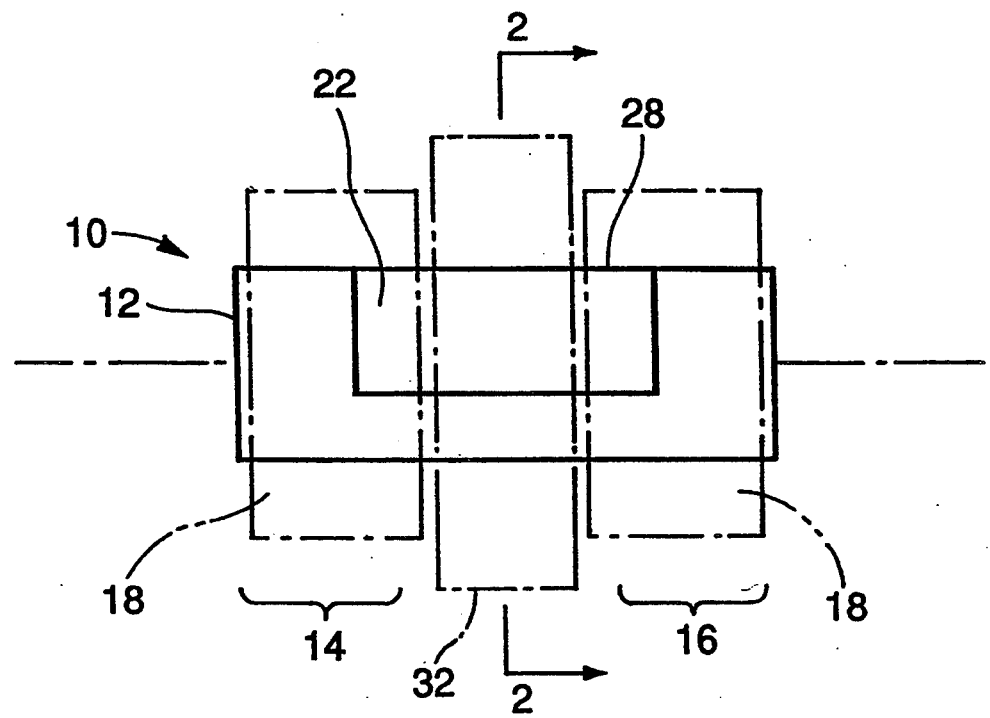
FIG. 1 is a side elevation view of a representative pin providing the hydrodynamic bearing of the present invention.
Figure 2:
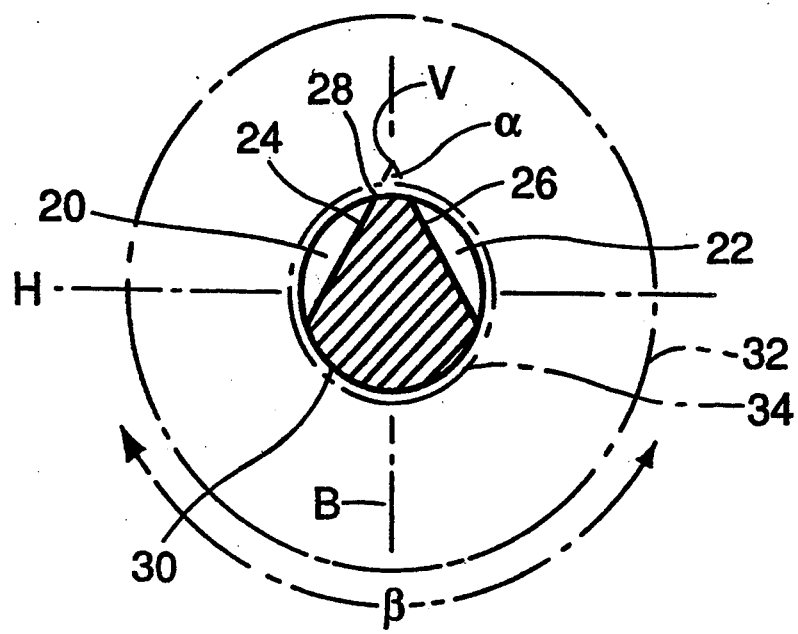
FIG. 2 is a cross-sectional view of the pin of FIG. 1 taken along line 2—2.

Referring to FIGS. 1–4, the hydrodynamic bearing 10 of the present invention includes a generally cylindrical pin 12 having first and second end portions 14, 16 for rigid connection to a supporting element 18, and first and second oil slots 20, 22 formed into the surface of the pin 12. The oil slots 20, 22 each extend lengthwise along respective portions of the pin 12 between the end portions 14, 16, as shown best in FIG. 1. The oil slots 20, 22 extend widthwise generally across respective chords 24, 26 of the pin circumference, as shown best in FIG. 2. Referring still to FIG. 2, the first and second oil slots 20, 22 are positioned in spaced relationship such that their respective chords 24, 26 define an angle $\alpha$ whose vertex V is beyond the circumference of the pin 12. An upper load bearing zone 28 is defined widthwise along the circumference of the pin 12 and lengthwise between the first and second oil slots 20, 22. A larger, lower load bearing zone 30 is defined widthwise along the circumference of the pin 12 generally opposite from the first load bearing zone 28, and lengthwise between the first and second oil slots 20, 22. Being generally opposite from the first load bearing zone 28 means that the larger, lower load bearing zone 30 may be somewhat offset and positioned asymmetrically relative to the first and second oil slots 20, 22.

Referring still to FIG. 2, the cylindrical pin surface is finished for direct contact with the cylindrical bore 34 of a roller 32 which oscillates through an arc β around the pin 12. As shown in the illustrative embodiment of FIG. 3, rotation of the roller 32 results from the relative motion between a rocking member 38 and a linear motion member 40. Pin 12 is mounted (e.g. friction fit) on the tines 18a of a rocker arm 38a and the roller 32 contacts the end 44 of a valve shaft 40a. In such an arrangement, a push rod 46 typically pushes upwards as indicated at P to rock the tines 18a of the rocker arm 38a downward. A spring 48 typically opposes the action of the push rod 46, and is mounted to return the valve stem 40a and the tines 18a upward as the push rod force abates. It is understood that the pin 12 and roller 32 could alternatively be mounted on the linear motion member 40 and contact a surface of the rocking member 38 to transmit motion between the elements, however, some undesirable side loading of the valve stem 40a may result. Such undesirable side loading could be substantially avoided by curving the surface of the rocking member 38 at the point of contact with the roller 32 (e.g. at the rocker tip) when roller 32 is mounted in this alternative position.

When the pin 12 is thus assembled with the roller 32, the first and second oil slots 20, 22 on the pin 12 define therewith large oil reservoirs. Oil from the first and second oil slots 20, 22 is readily available over the entire load bearing zone 28, 30. As the roller 32 oscillates through an arc β, oil wipes across the roller surfaces and lubricates the roller/pin interface. The availability of large quantities of oil to the load bearing zones 28, 30 also serves to flush debris from the load bearing zones. Thus, when pressure is applied to the rocker tip roller 32 and causes the roller 32 to roll relative to the pin 12, a squeeze film more completely develops across the interface, and the ample quantity of oil available helps flush debris from the interface when the oil squeezes axially along the pin away from the interface.

Referring to FIG. 2, it is preferred in accordance with the present invention that the first and second oil slots 20 and 22 have approximately the same dimensions, and that they be substantially planar.

Alternately, the surfaces of the first and second oil slots 20, 22 may be slightly concave, as may be desirable for manufacturing purposes. It is preferred that such slightly concave oil slot surfaces have a radius R more than approximately five times the diameter of the cylindrical pin 12. This is desirable because too sharp a radius will cause the pin 12 to act as a scraper against the bore 34 of the roller 32 during rotation thereof. Thus, referring to FIG. 4, it may also be said that in the alterative embodiment where there are slightly concave oil slot surfaces, it is preferred that the angle γ between a line l₁ tangential to the concave surface and a line l₂ tangential to the circumference of the pin 12 at the intersection thereof is less than 90 degrees.

Referring again to FIG. 2, in accordance with the present invention, the oil slots 20, 22 are preferably cut into the pin below the horizontal centerline H of the pin 12 to facilitate oil flow from the large reservoirs of oil slots 20, 22 into the lower load bearing zone 30 for long-life performance. The lower load bearing zone 30 is where the hydrodynamic bearing 10 preferably experiences its highest loading, as typified by the illustrative application of FIG. 3. To further facilitate oil flow, to the load bearing zones 28, 30, it is also useful in some applications to remove (i.e. bevel) the edges of the oil slots where they intersect the circumference of the pin 12. The beveled edge 42 may be either curved (convex) or planar, as representatively shown in FIG. 4.

As well, in accordance with the present invention, it is preferred that the lower load bearing zone 30 include at least 120 degrees of the pin circumference. In combination with the upper load bearing zone 28, such a lower load bearing zone 30 provides, in effect, "three-point" contact between the pin 12 and roller 32, which provides stability, maintains control of the pin 12 in the roller 32, and promotes long-life operation. The upper load bearing zone 28 preferably has a width along the circumference of the pin 12 which is greater than approximately 10 percent of the pin diameter. Such width serves to spread the load imposed thereon, and thus prevents the upper load bearing zone 28 from acting as a scraper against the bore surface of roller 32.

Thus, in accordance with the preferred cut of the oil slots 20, 22 below the horizontal centerline H of the pin 12 to enhance oil flow, and the preferred circumferential width greater than 120 degrees of the lower load bearing zone 30, it may be understood with reference to FIG. 4, that the angle α defined by the respective chords 24, 26 of the first and second oil slots 20 and 22 preferably is in the range of approximately 60 degrees to approximately 90 degrees.

Referring to FIG. 1, it is preferred that the first and second oil slots 20, 22 extend lengthwise a distance greater than the width of a roller 32 mounted on the pin 12. This facilitates the flow of lubricating oil into the oil slots 20, 22. Oil arrives at the pin 12 typically from mist or spray which is present in a mechanism. For example, in the engine embodiment shown in FIG. 3, oil mist or spray may result from forced lubrication of the bearing 50 on rocker arm 38a. It is further preferred that the first and second oil slots 20, 22 extend lengthwise into parts of the end portions 14, 16 one-quarter to one-third the width of the end portions 14, 16, so that exact lateral positioning of the pin 12, which is rigidly maintained in position in the tines 18a of rocker arm 38a by friction fit, is not critical.

Figure 2A:
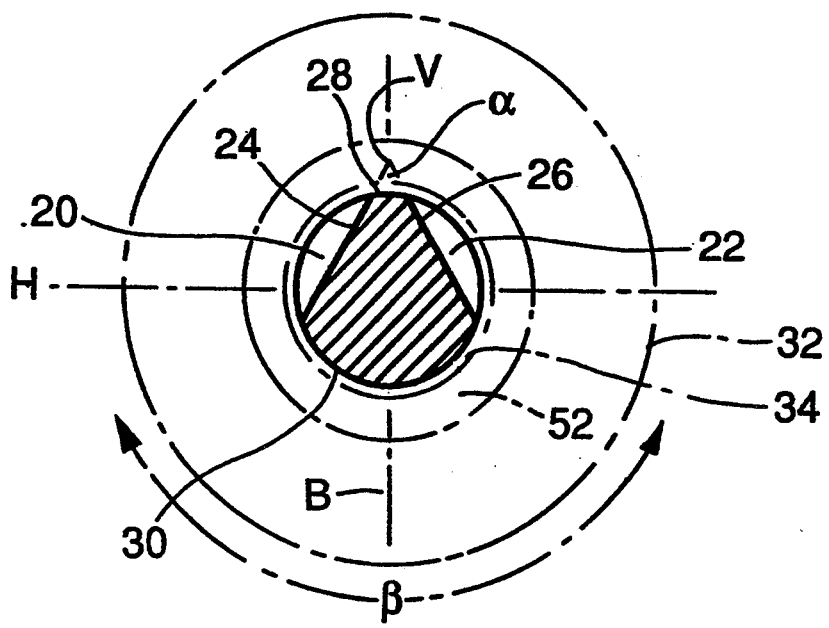
FIG. 2a is a cross-sectional view of an alternative embodiment to the embodiment shown in FIG. 2.
Figure 3:
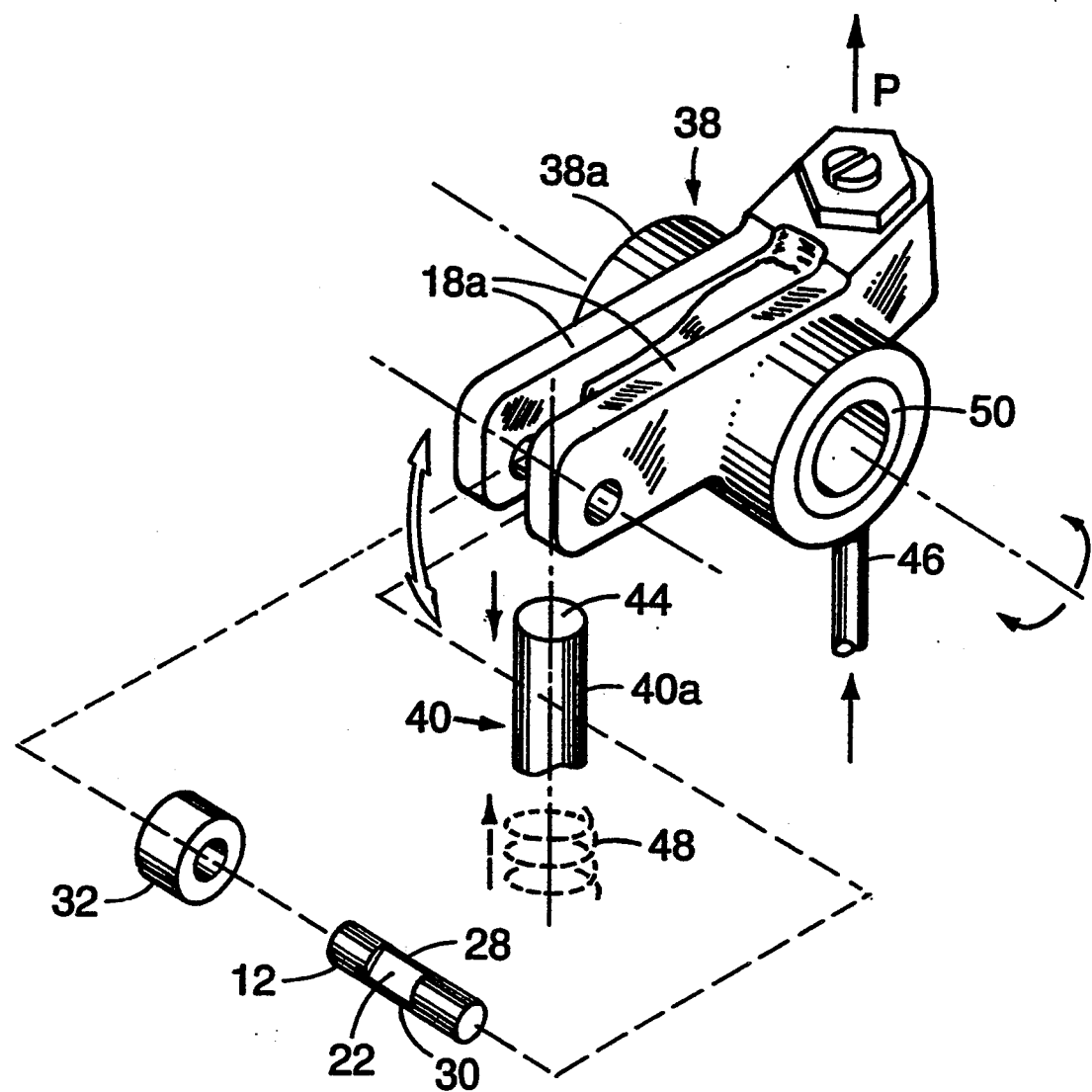
FIG. 3 is an exploded perspective view of the present invention in a representative rocker arm assembly typical of combustion engines.

In an alternative embodiment, the hydrodynamic bearing 10 may further include a cylindrical bushing 52 (partially indicated by phantom line in FIG. 2a) having a cylindrical bore therethrough for contact with the pin 12. Bushing 52 is positioned over the first and second oil slots 20, 22, and like the roller surface which it protects, is preferably narrower than the length of the first and second oil slots 20, 22.

For purposes of illustration, and not limitation, a representative pin 12 for use in a small combustion engine rocker arm 38a could have a diameter of approximately 0.22 inches, with oil slots 20, 22 positioned 60 degrees apart. The oil slots could thus be approximately 0.24 inches long by 0.16 inches wide along the chords 24, 26, separated at the upper load bearing zone 28 by a straight line distance of 0.040 inches. The gap between the roller 32 and tines 18a on each side would be in the range of 10 to 15 mils. In such an application, the pin 12 is preferably made of high carbon (e.g. 1%) or carburizing steel, hardened to HRC 60±2, and is in contact with a roller 32 of similar material and hardness.

Figure 4:
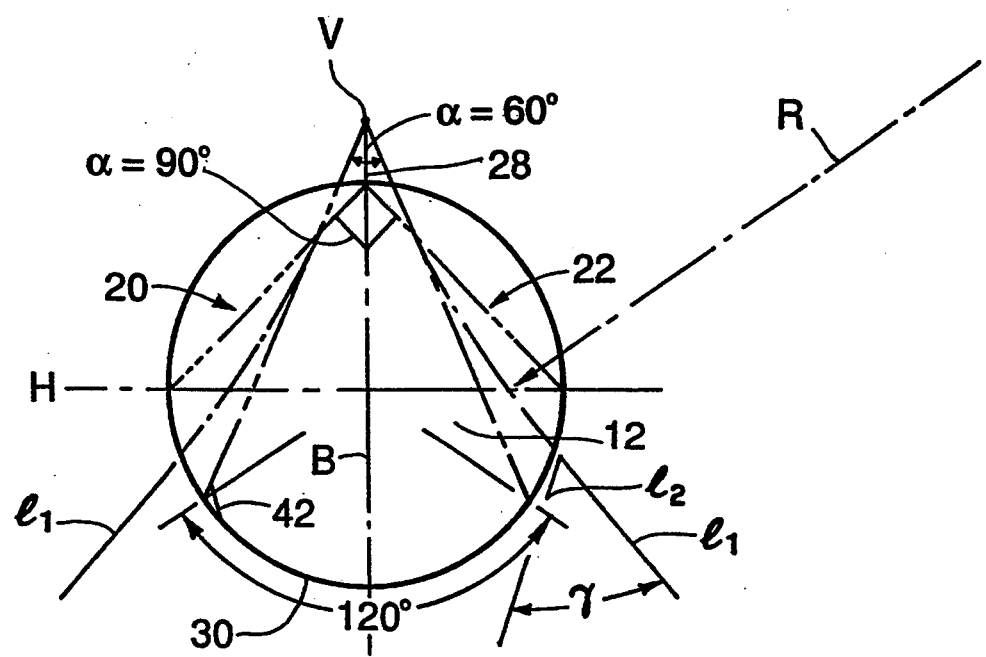
FIG. 4 is a schematic cross-sectional view of the pin of FIG. 1 taken along line 2—2 showing the geometry of the pin.

Referring to FIGS. 1 and 4, in any application, it is preferred that the bisector B of the angle α is preferably directed towards the load (or center of the arc β) at the lower load bearing zone 30, for balanced loading of the load bearing zones 28, 30. Further, it is understood that the pin 12 of the present invention may be used in any orientation, and is not limited to the orientations shown in the drawings. While upside-down orientation may cause less oil to remain in the oil slots 20, 22, capillary action and surface tension of the oil are sufficient to retain the relatively large volumes of oil in the oil slots 20, 22 which provide the superior lubrication and flushing of debris made possible in accordance with the present invention. Even with only 15 to 20% of the oil slots 20, 22 filled, the amount of oil available at the roller/pin interface greatly exceeds that available conventionally, and readily achieves the purposes of lubrication of the interface and flushing of debris therefrom.

While certain representative embodiments have been shown for purposes of illustrating the invention, it will be apparent to those skilled in the art that various changes in the hydrodynamic bearing disclosed herein may be made without departing from the scope of the invention, which is defined in the appended claims.

What is claimed is:

1. A hydrodynamic bearing for limited roller oscillation comprising:
    a generally cylindrical pin including:
        first and second end portions for connection to a supporting element;
        first and second oil slots formed into the surface of said pin, each said oil slot extending lengthwise along respective portions of the pin generally between said end portions, and extending widthwise generally across respective chords of the pin circumference, said first and second oil slots positioned in spaced relationship such that their respective chords define an angle;
        an upper load bearing zone defined widthwise along the circumference of the pin and lengthwise between said first and second oil slots; and
        a lower load bearing zone defined widthwise along the circumference of the pin generally opposite the upper load bearing zone and lengthwise between said first and second oil slots, said lower load bearing zone being larger than said upper load bearing zone;
    wherein said pin surface is finished for direct contact with the cylindrical bore of a roller which oscillates through an arc around said pin.

2. The bearing of claim 1 wherein the first and second oil slots have approximately the same dimensions.

3. The bearing of claim 1 wherein the respective chords of said first and second oil slots define an angle whose vertex is beyond the circumference of said pin.

4. The bearing of claim 3 wherein the angle defined by the respective chords of the first and second oil slots is in the range of approximately 60 degrees to approximately 90 degrees.

5. The bearing of claim 1 wherein the first and second oil slots are substantially planar.

6. The bearing of claim 1 wherein the surfaces of the first and second oil slots are slightly concave, and for each oil slot, the angle between a line tangential to the concave surface and a line tangential to the circumference of the pin at the intersection thereof is less than 90 degrees.

7. The bearing of claim 1 wherein the surfaces of the first and second oil slots are slightly concave, and the concave surface of each oil slot has a radius more than approximately five times the diameter of the cylindrical pin.

8. The bearing of claim 1 wherein at the intersection of oil slot surface and the circumference of the pin, at least one edge of at least one oil slot is a beveled edge.

9. The bearing of claim 1 wherein the lower load bearing zone includes less than half the circumference of the pin.

10. The bearing of claim 1 wherein the lower load bearing zone includes at least approximately one-third of the circumference of the pin.

11. The bearing of claim 1 wherein the width of the upper load bearing zone along the circumference of the pin is greater than approximately one-tenth the diameter of the pin.

12. The bearing of claim 1 wherein the first and second oil slots extend lengthwise a distance greater than the width of a roller mounted thereon.

13. The bearing of claim 1 wherein the first and second oil slots extend lengthwise into parts of said end portions.

14. The bearing of claim 1 further comprising a cylindrical bushing having a cylindrical bore therethrough and positioned over said first and second oil slots, said bushing having a width less than the length of the first and second oils slots, whereby the first and second oil slots extend lengthwise beyond at least one side of said first and second oil slots.

15. A hydrodynamic bearing for limited roller oscillation comprising:
    a generally cylindrical pin including:
        first and second end portions for connection to a supporting element;
        first and second oil slots formed into the surface of said pin, each said oil slot extending lengthwise along respective portions of the pin generally between said end portions, and extending widthwise generally across respective chords of the pin circumference, wherein said first and second oil slots:
            are substantially planar;
            have approximately the same dimensions; and
            are positioned in spaced relationship such that their respective chords define an angle whose vertex is beyond the circumference of said pin, wherein said angle is in the range of approximately 60 degrees to approximately 90 degrees;
        an upper load bearing zone defined widthwise along the circumference of the pin and lengthwise between said first and second oil slots; and
        a lower load bearing zone defined widthwise along the circumference of the pin substantially opposite the upper load bearing zone and lengthwise between said first and second oil slots, said lower load bearing zone being larger than said upper load bearing zone;
    wherein said pin surface is finished for direct contact with the cylindrical bore of a roller which oscillates through an arc around said pin.

16. The bearing of claim 15 wherein:
    the first and second oil slots extend lengthwise a distance greater than the width of a roller mounted thereon into parts of said end portions; and
    the width of said upper load bearing zone along the circumference of said pin is greater than approximately one-tenth the diameter of said pin; and
    said lower load bearing zone includes at least approximately one-third of the circumference of the pin.

17. A combustion engine having a rocking motion member and a linear motion member, said rocking motion member including:

a hydrodynamic bearing for limited roller oscillation; and a roller rotatably mounted on said hydrodynamic bearing and in frictional contact with said vertical motion member for oscillation through an arc;

wherein said hydrodynamic bearing comprises:

a generally cylindrical pin including:

first and second end portions for connection to said rocking motion member;

first and second oil slots formed into the surface of said pin, each said oil slot extending lengthwise along respective portions of the pin generally between said end portions, and extending widthwise generally across respective chords of the pin circumference, said first and second oil slots positioned in spaced relationship such that their respective chords define an angle;

an upper load bearing zone defined widthwise along the circumference of the pin and lengthwise between said first and second oil slots; and a lower load bearing zone defined widthwise along the circumference of the pin generally opposite the upper load bearing zone and lengthwise between said first and second oil slots, said lower load bearing zone being larger than said upper load bearing zone;

wherein said pin surface is finished for direct contact with the cylindrical bore of a roller which oscillates through an arc around said pin.

18. The bearing of claim 17 wherein the respective chords of said first and second oil slots define an angle whose vertex is beyond the circumference of said pin.

19. The bearing of claim 17 wherein the angle defined by the respective chords of the first and second oil slots is in the range of approximately 60 degrees to approximately 90 degrees.

20. The bearing of claim 17 wherein the first and second oil slots extend lengthwise into parts of said end portions.

* * * * *